A. W. HUTCHINS.
METHOD OR PROCESS OF ABSORBING MOISTURE FROM WET SURFACES OF ARTICLES OF JEWELRY, &c.
APPLICATION FILED FEB. 3, 1911.
1,012,644.
Patented Dec. 26, 1911.
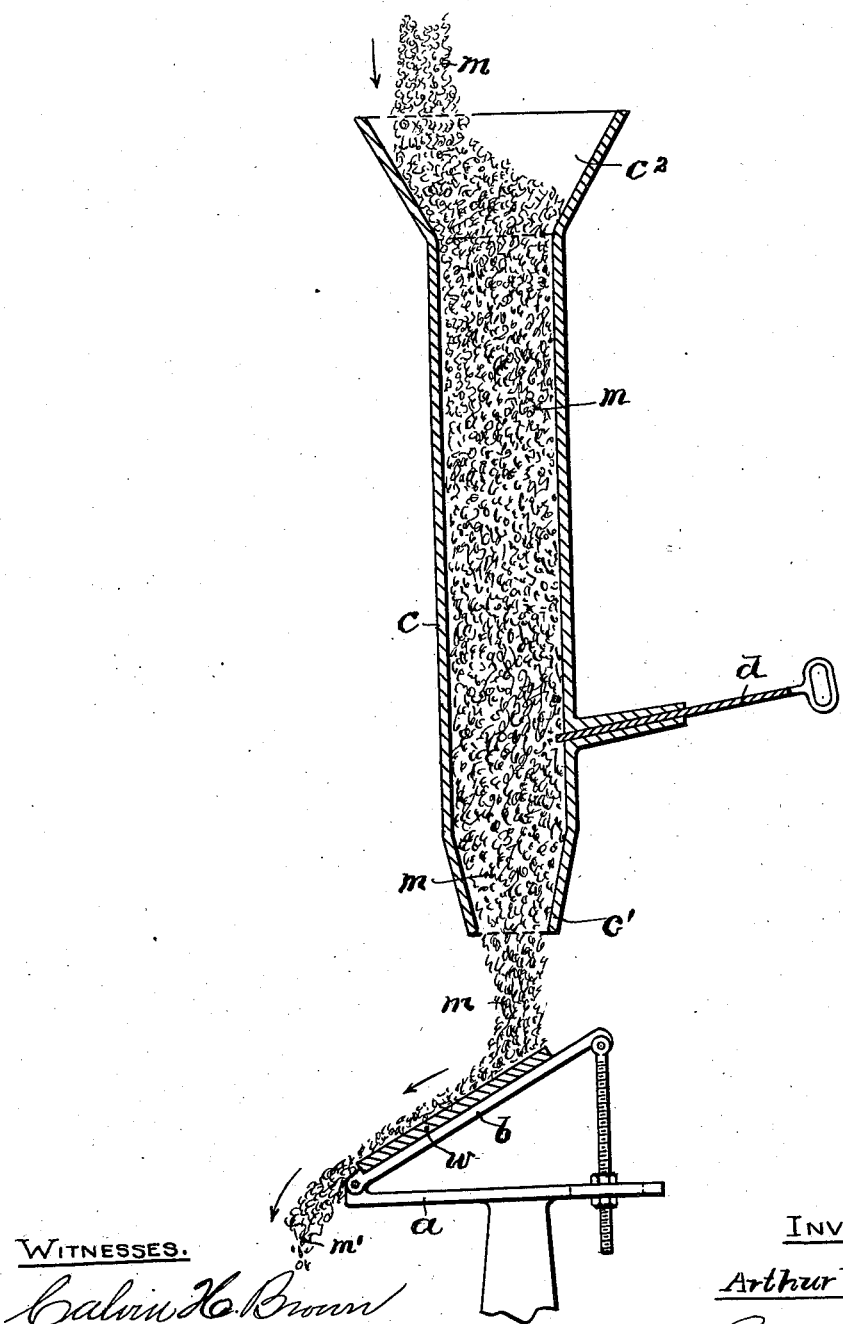
WITNESSES.
Calvin H. Brown
Willard W. Bardsley
INVENTOR.
Arthur W. Hutchins.
By Geo. H. Remington
ATTY.

UNITED STATES PATENT OFFICE.

ARTHUR W. HUTCHINS, OF CRANSTON, RHODE ISLAND.

METHOD OR PROCESS OF ABSORBING MOISTURE FROM WET SURFACES OF ARTICLES OF JEWELRY, &c.

1,012,644.  Specification of Letters Patent.  Patented Dec. 26, 1911.

Application filed February 3, 1911. Serial No. 606,291.

*To all whom it may concern:*

Be it known that I, ARTHUR W. HUTCHINS, a citizen of the United States, residing at Cranston, in the county of Providence and State of Rhode Island, have invented certain new and useful Improvements in Methods or Processes of Absorbing Moisture from Wet Surfaces of Articles of Jewelry, &c., of which the following is a specification.

This invention relates to improvements in the art or methods of drying or absorbing fluids or moisture from articles having impervious surfaces; that is to say, articles of jewelry, articles made of base metals, glass, porcelain, &c.

In the production of various articles of the character referred to, the same, after completion, are usually temporarily subjected to water or chemical fluid baths of different kinds, and hot or cold, as the case may be, for the purpose of cleansing them. The articles, upon being removed from the bath, are, while still wet, usually embedded in an inert mass of absorbent substance, as sawdust, contained in a tank and permitted to remain therein until the sawdust has taken up or absorbed the moisture. Sometimes the absorbent material is kept artificially heated, so as to facilitate the drying process. It may be stated that the non-heated sawdust at times becomes practically saturated with the moisture absorbed from the thus embedded articles: In such event the moisture-laden sawdust must be removed and the tank recharged with dry sawdust; the operation being repeated until the articles are thoroughly or properly dried.

I have discovered a process whereby articles of the kind or character referred to can, when removed from the bath, be quickly and completely dried in an inexpensive and more efficient manner, by subjecting the wet or moist surfaces to a suitably directed, continuous stream of dry moisture-absorbing substance or material, as sawdust, flowing from a controlled source of supply containing the dry absorptive material. The work or article thus acted upon is suitably positioned with relation to the outflowing sawdust, so that the particles of the latter impinge and act upon the exposed surface and at the same time, during its passage across the surface, take up or absorb an amount of moisture therefrom. Thus it will be apparent that a continuous moving stream or current of dry absorbent material or substance is presented to the surface acted upon, with the result that the moving volume of dry sawdust in a loose state not only absorbs the liquid or moisture from the surface of the article acted upon, but it also imparts to the surface a clean or untarnished appearance, all as more fully hereinafter set forth and claimed.

In the accompanying sheet of drawings is represented, in vertical central section, a simple apparatus illustrating a manner of carrying out my improved method of completely taking up moisture from the wet surfaces of articles disposed with relation and being subjected to a continuous flow of dry absorptive material or substance, as sawdust.

In the drawings $a$ designates a base having a work-supporting plate $b$ jointed or pivoted thereto and arranged to suitably hold a piece of work or article, as $w$, thereon. The drawing further shows means for varying the angular position of the plate $b$ with respect of the base $a$. A tube or container $c$ is mounted and disposed so that its outlet or nozzle $c^1$ is capable of discharging its contents directly onto the surface of the work or article $w$ to be acted upon. The upper portion of the container may be enlarged to serve as a hopper or reservoir $c^2$.

In order to regulate or control the outflow of material from the container, and also to completely shut it off, a suitably mounted, manually movable gate $d$ may be employed.

The following describes the manner of operation: The absorptive material $m$ is supplied in a dry state to the container $c$ in any suitable manner and is arranged to flow from the discharge-outlet $c^1$ in a controlled, continuous stream or current directly onto the adjacent exposed moist or wet surface of an article or piece of work, as $w$, suitably held or supported therebeneath. The flow of the particles of material $m$ in a loosely combined state operates, in moving across the said moist surface, to automatically take up or absorb the moisture. The outflow of the dry absorbent material is continued uninterruptedly until the acted upon surface of the work becomes completely dry. While this is taking place, the resulting waste or spent material $m^1$, then carrying the moisture which it had absorbed or taken up in its forward movement, passes off to be redried or reused, if desired. Thus it is clear that the column of continuously moving dry material $m$ from the outlet $c^1$ acts upon the wet or moist surface of the work in a decreasing ratio; that is to say, the first portion of the dry absorbent to engage the said surface takes up a greater quantity of the moisture from it while the immediately succeeding, but connected portions absorb less and less, until the surface becomes perfectly dry, at which instant the work may be removed or the supply of dry absorbent temporarily cut off.

I would add that in my improved method of drying, which involves the use of dry moisture-absorptive material, in a more or less comminuted state, the same is or may be disposed so as to flow by gravity action upon the surface of the work to be treated, the latter at the same time being held or positioned at an angle, the degree of which angle exceeds the "angle of repose" of the absorbent material, thus causing the latter to move downward by gravity while it is taking up the moisture, and thereby, too, presenting a continuous automatic advance movement of absorptive material to and from the surface of the work being acted upon.

The absorptive substance employed must obviously be of a relatively soft fibrous or spongy character, so as not to abrade or injure the surface of the work while moving on it. Non-resinous sawdust, as well as finely cut threads of linen, cotton, &c., are well adapted to be used. In any case, however, the material should be thoroughly dry before it is employed in connection with my improved process.

The surface of the work acted upon as herein described is rendered much cleaner and brighter thereby than is possible under the usual practice, in which the work, when removed from the bath, is simply embedded in an inert mass of sawdust for taking up the moisture.

I claim as my invention:—

The improved method herein described of absorbing and carrying off moisture from the wet surface of an article; which consists in suitably supporting or holding the article to be acted upon during the drying process, then directing a stream of dry absorptive substance, as sawdust, directly upon said wet surface from a controlled source of supply, and continuing the said movement of the absorbent uninterruptedly until it has taken up and removed all the moisture from the surface thus acted upon.

In testimony whereof I have affixed my signature in presence of two witnesses.

ARTHUR W. HUTCHINS.

Witnesses:
 CALVIN H. BROWN,
 GEO. H. REMINGTON.